UNITED STATES PATENT OFFICE.

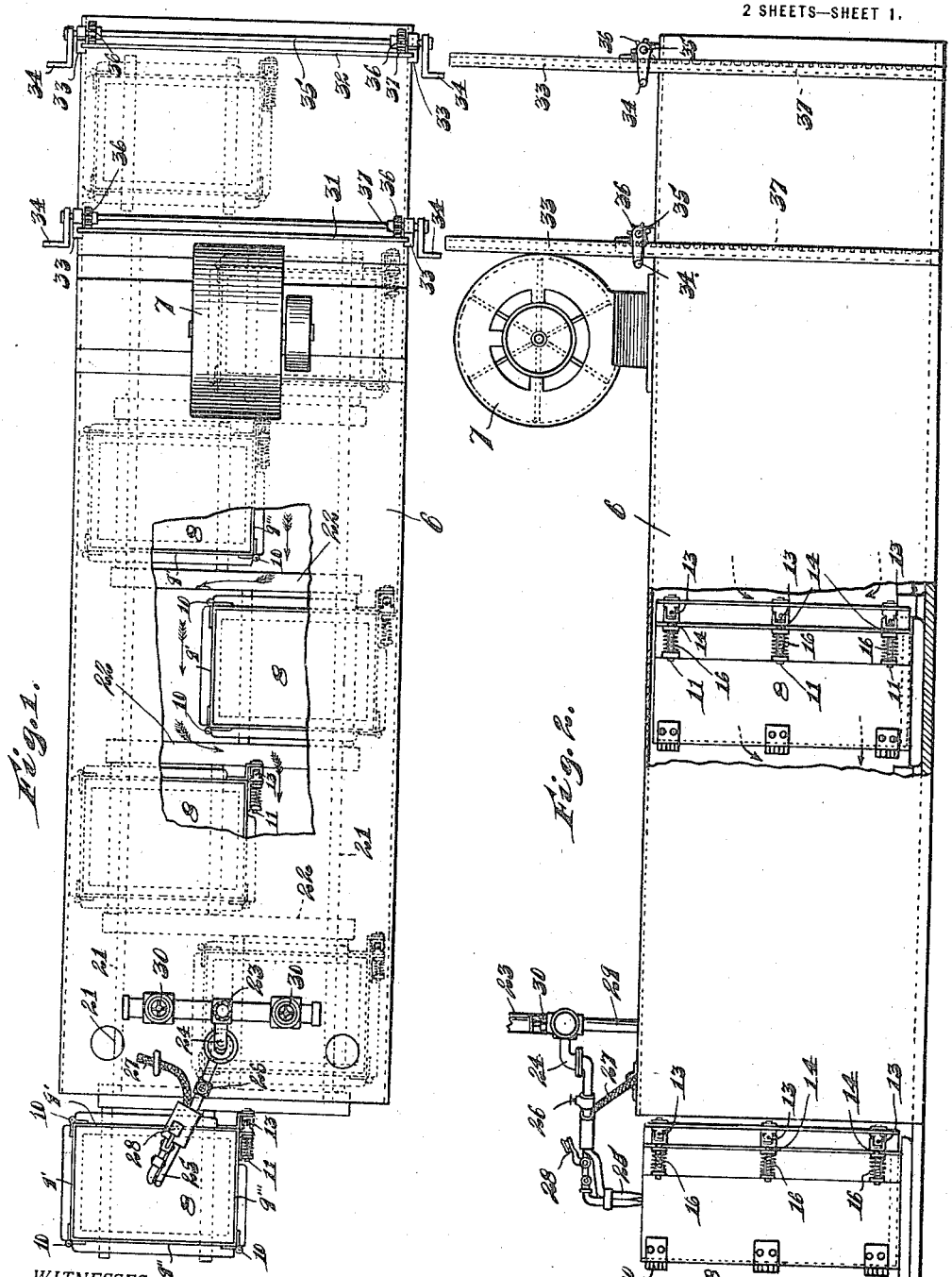

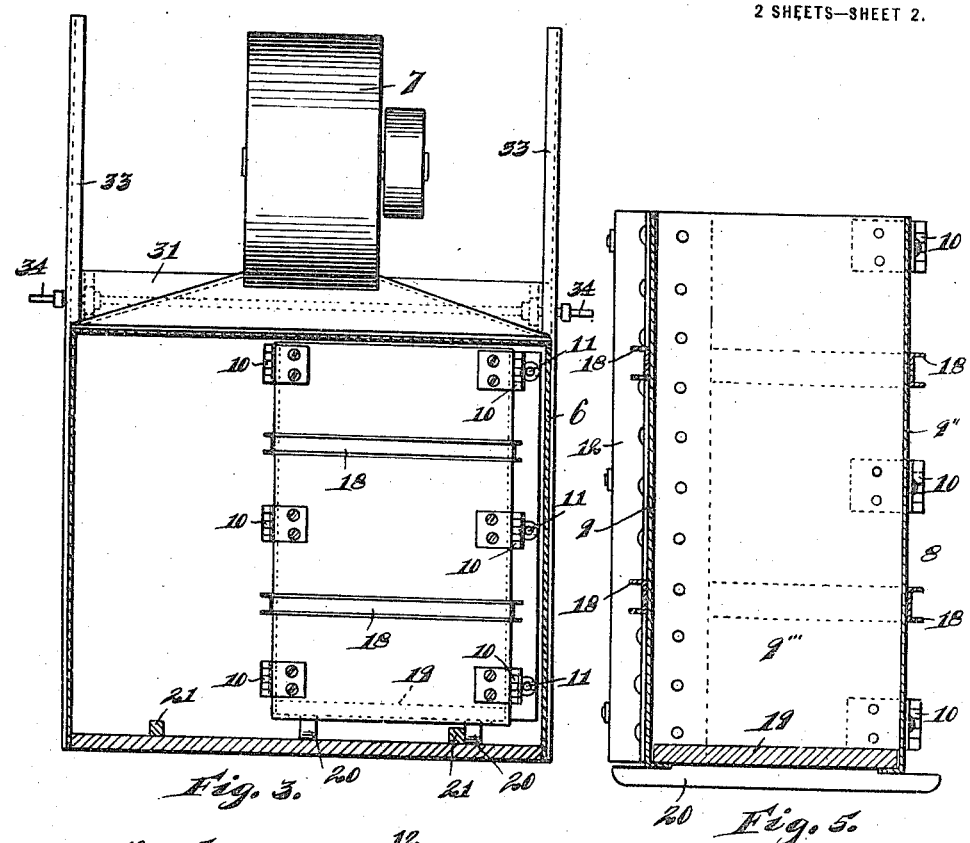
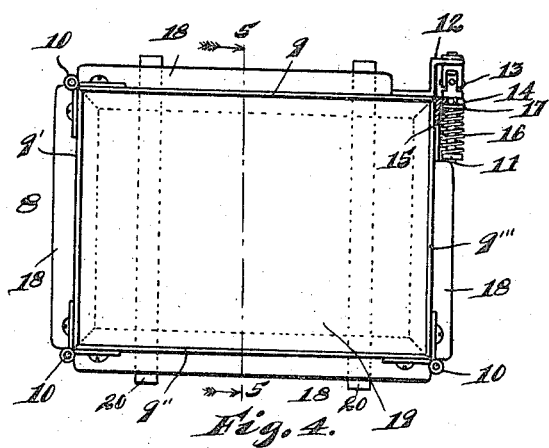

ROSCOE C. SINKES, OF CHICAGO, ILLINOIS.

APPARATUS FOR MANUFACTURING ICE.

1,268,168.   Specification of Letters Patent.   Patented June 4, 1918.

Application filed February 16, 1917. Serial No. 149,078.

*To all whom it may concern:*

Be it known that I, ROSCOE C. SINKES, a citizen of the United States, and a resident of the city of Chicago, county of Cook, and State of Illinois, have invented a certain new and useful Apparatus for Manufacturing Ice, of which the following is a specification.

My invention relates to a new and improved apparatus for the manufacturing of ice, and has for its object the production of an apparatus through the medium of which the natural cold during the winter months or cold weather, may be utilized in the manufacture of ice.

A further object is the production of an apparatus which will be extremely simple but at the same time highly effective for the rapid freezing of water into cakes of ice with the use simply of natural cold as the freezing medium.

Other objects will appear hereinafter.

The invention consists in the combinations and arrangements of parts hereinafter described and claimed.

The invention will be best understood by reference to the accompanying drawing forming a part of this specification, and in which, Figure 1 is a partially sectional top plan view of the freezing apparatus, embodying the invention, Fig. 2, a partially sectional side elevation thereof, Fig. 3, a vertical transverse section of the same, Fig. 4, a partially sectional top plan view of one of the receptacles employed in which the water is frozen into cakes of ice, and Fig. 5, a section taken on line 5—5 of Fig. 4.

The preferred form of construction, as illustrated in the drawings, comprises an elongated chamber or passage 6 which is entirely closed except for inlet and outlet openings at its ends. Mounted upon the top of said chamber 6 adjacent the outlet end thereof is a power-driven fan or blower 7 having communication with the interior of said chamber and through the medium of which, when in operation, a current or blast of air, taken from the outside atmosphere, will be forced into and through the chamber 6, toward the inlet opening of said chamber, that is toward the left, as shown in Figs. 1 and 2.

With the chamber 6 are employed open receptacles 8, the number of said receptacles employed being determined by the length of said chamber, and the length of said chamber being dependent upon the temperature of the place where the apparatus is used.

The receptacles 8 are of substantially rectangular form, each of the same comprising a plurality of lateral wall forming members 9, 9′, 9″, and 9‴, which are hingedly connected at 10, as clearly seen in Figs. 3, 4 and 5. In order to allow for the normal expansion of water, such as takes place at a certain temperature in the freezing of the same, the adjoining edges of wall members 9 and 9‴ are yieldingly connected together by means of a series of engaging or latch members 11 which are secured at their outer ends to an angle iron bar 12 fixed to the wall member 9, as clearly seen in Fig. 4. A universal joint 13 is provided in each of the members 11 to permit of ready pivoting or swinging of the inner end of the same. Said inner ends of the members 11 are adapted for engagement with outwardly opening notches or slots 14 formed in an angle iron bar 15 fixed to the adjoining edge of wall member 9‴. A helical compression spring 16 provided upon each of the members 11 engages against a collar 17 loosely mounted upon each member 11, which collar is adapted to engage against the adjacent side of the bar 15. With this construction it is of course apparent that the inner ends of members 11 are adapted for releasable engagement with the bar 15, and that the springs 16 serve to yieldingly hold the wall members 9 and 9‴ in operative relation. With this arrangement, in the expansion of the water, in the freezing of the same, said springs will yield to compensate for such expansion and prevent distortion or breaking of the receptacle under the pressure. Transversely extending channel bars 18 are provided upon the outer sides of wall members 9, 9′, 9″ and 9‴ for reinforcement.

The lower ends of wall members 9, 9′, 9″ and 9‴ loosely engage with a bottom member 19 of wood, the engagement of said wall members with said bottom member being such that in the freezing operation, after a cake of ice has been formed in any one of the receptacles in the manner as will be hereinafter more fully set forth, the lateral wall members may be removed and a cake of ice permitted to remain upon the bottom member 19 until ready for further handling. Provided upon the under side of each bottom member 19 is a pair of skids 20 adapted, in the operation of the apparatus to engage with and slide over the bottom of the chamber 6.

It is desirous that the receptacles in the travel of the same through the chamber 6 be arranged in staggered relation, since, with this arrangement of the same a tortuous passage is formed and the cold air thus caused to impinge against all sides of each receptacle. To insure this staggered relation of the receptacles in the travel of the same through chamber 6, rails 21 are arranged upon the bottom of said chamber for engagement with the skids 20, as clearly seen in Figs. 1 and 3. The formation of the tortuous passage mentioned is also aided by the use of spacing blocks or timbers 22 which are placed between successive receptacles in the introduction of said receptacles into the chamber 6. These spacing members 22 are loose and unconnected with any other part, serving only the purpose of spacing means for the receptacles in the passage of the latter through chamber 6.

In using the apparatus, the receptacles 8 are supplied with water from a supply pipe 23 which communicates with any suitable source of supply. From pipe 23 leads a branch pipe 24 which terminates in a spraying device 25 of approved design, a suitable valve 26 being interposed in the pipe 24 for controlling the flow of water therethrough. A compressed air supply pipe 27 also communicates with the spraying device 25, the flow of compressed air being controlled by a manually operable valve 28. The arrangement is such that in the employment of the apparatus, each receptacle, preparatory to the filling of the same with water, is sprayed internally with water by means of the spraying device 25. The water thus sprayed upon the inner surface of each receptacle will immediately freeze by reason of the natural cold, thus forming a lining of ice in each receptacle which will serve to effectually seal the same against any leakage. After this spraying operation each receptacle is pushed into the inlet end of the chamber 6 where water is supplied thereto through either one of branch pipes 29 leading from supply pipe 23. Suitable valves 30 control the flow of water through pipes 29. Thus each receptacle is successively sprayed and filled with water, the successive receptacles being lined up one behind the other so that as a new receptacle is sprayed and pushed into the chamber 6, the entire line of receptacles will be advanced in said chamber. The receptacles are thus pushed through the chamber 6, step by step, until the opposite or discharge end of said chamber is reached. The forcing of a draft of cold air, as supplied from the outside atmosphere, through the chamber 6 by the blowing device 7, serves to continually remove or withdraw from the chamber 6 the vapor and heat given off from the water contained in the receptacles 8, thereby greatly facilitating the freezing of the water, and, with the result that when each receptacle arrives at the discharge end of the chamber 6, the water contained therein will have been frozen into one solid cake of ice.

In order to prevent the air forced into the chamber 6 by the blower 7 from escaping through the outlet end of said chamber as the receptacles are removed, a pair of spaced doors or closures 31 and 32 are provided which are slidable vertically in channel guides 33 arranged, as seen, at the discharge end of chamber 6. Said doors are independently movable, each being operable or movable through the medium of a crank handle 34 fixed to a shaft 35 on which are arranged gears 36 meshing with racks 37 provided upon the adjacent side of the corresponding door 31 or 32. The space between the doors 31 and 32 is such as to accommodate one of the receptacles 8, and in the operation of the apparatus the doors 31 and 32 will be alternately operated, that is each receptacle will first pass the door 31 and will not be permitted to pass the door 32 until the door 31 is closed. With this arrangement it is of course apparent that the discharge end of the chamber 6 will always be closed, and thus the escape of air through the discharge end of the chamber 6, prevented. As the receptacles are successively removed from the chamber 6, the lateral wall members 9, 9', 9'' and 9''' will be removed from the cakes of ice, and after the cakes of ice have been carried away, the receptacles will again be assembled and reused in the manner just described.

While I have illustrated and described the preferred form of construction and the preferred steps in the process for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. Apparatus for freezing water into cakes of ice comprising an elongated closed chamber; a plurality of open receptacles adapted for travel through said chamber; means for forcing air into one end of said chamber; means for the exhaust of the air from the other end of said chamber; and a pair of independently operable closures at the first mentioned end of said chamber having a space between the same sufficient to accommodate one of said receptacles, substantially as described.

2. Apparatus for freezing water into cakes of ice comprising an elongated closed chamber; a plurality of open receptacles adapted for travel through said chamber; means for maintaining said receptacles in staggered relation in the travel of the same through said chamber; and means for creating a draft of air through said chamber around said receptacles, substantially as described.

3. Apparatus for freezing water into cakes of ice comprising an elongated closed chamber; a plurality of open receptacles adapted for travel through said chamber; rails on the bottom of said chamber for maintaining said receptacles in staggered relation in the travel of the same through said chamber; and means for creating a draft of air through said chamber around said receptacles, substantially as described.

4. Apparatus for freezing water into cakes of ice comprising an elongated closed chamber; a plurality of open receptacles adapted for travel through said chamber; means for maintaining said receptacles in staggered relation in the travel of the same through said chamber; and means for holding said receptacles in spaced relation with each other in the travel of the same through said chamber, substantially as described.

5. Apparatus for freezing water into cakes of ice comprising an elongated closed chamber; a plurality of open receptacles adapted for travel through said chamber; skids on which said receptacles are mounted for conveying of the same through said chamber; and means for forcing a current of cold air through said chamber from one end of the same to the other, substantially as described.

In testimony whereof I have signed my name to this specification in the presence of two subscribing witnesses.

ROSCOE C. SINKES.

Witnesses:
JOSHUA R. H. POTTS,
ARTHUR A. OLSON.

Copies of this patent may be obtained for five cents each, by addressing the "Commissioner of Patents, Washington, D. C."